Patented Jan. 5, 1932

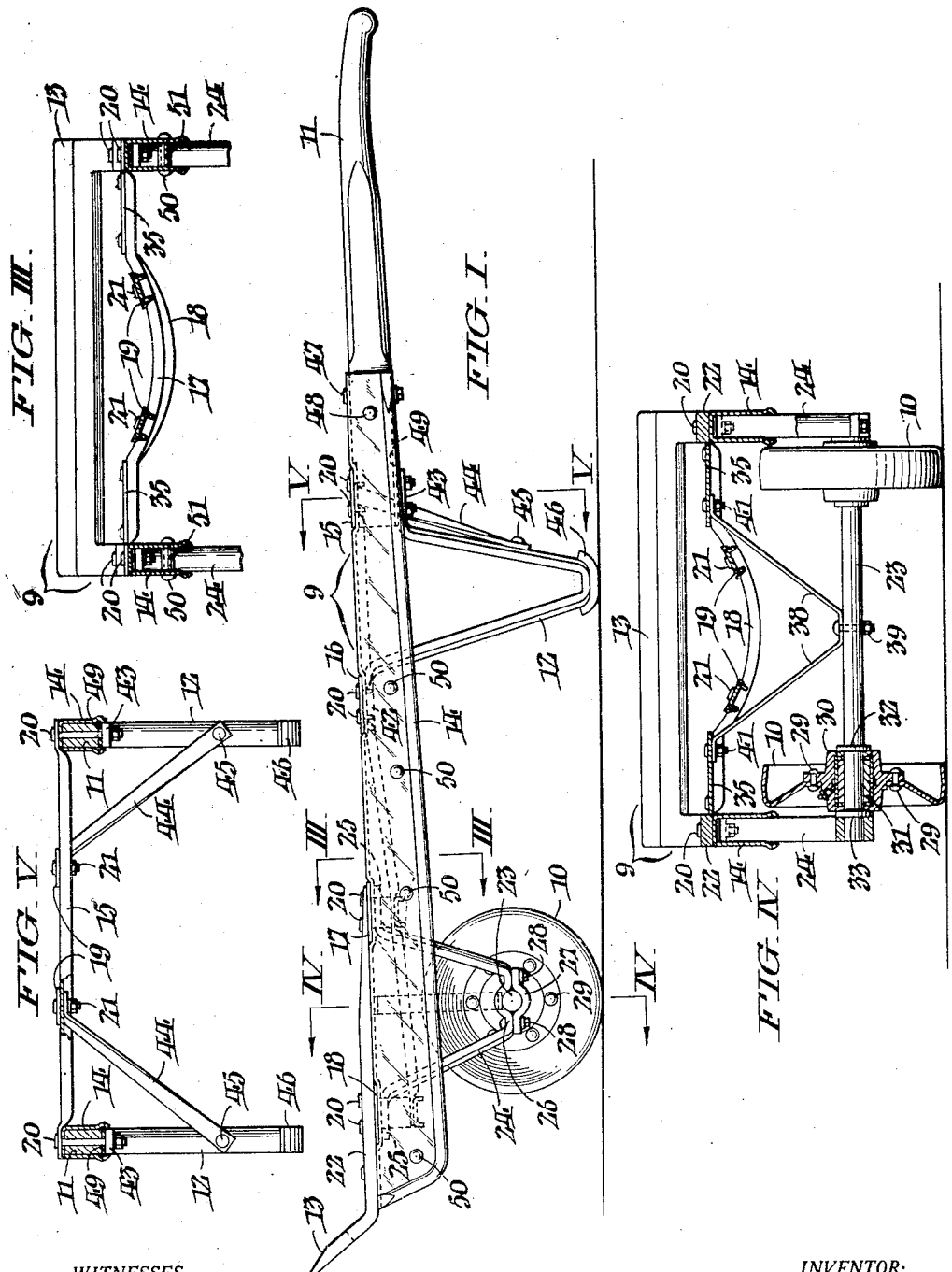

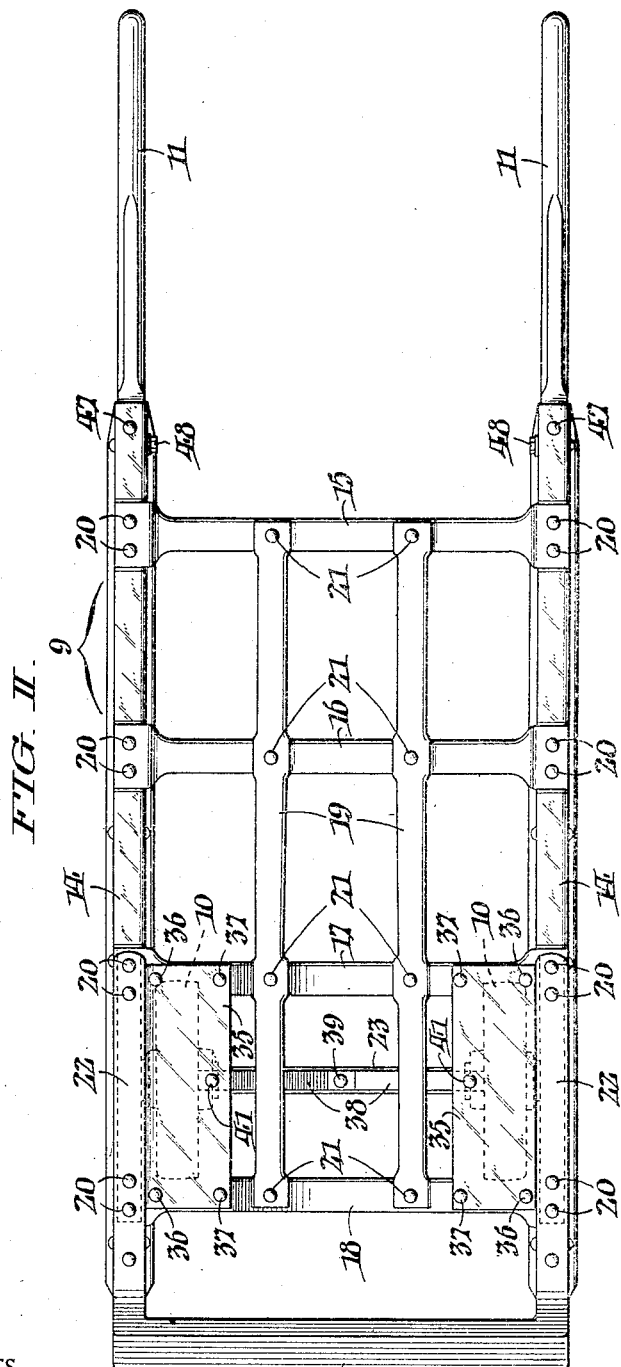

1,840,293

UNITED STATES PATENT OFFICE

DAVID M. WATSON, OF ARDSLEY, AND GONZALO C. MUÑOZ, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA

HAND TRUCK

Application filed October 7, 1930. Serial No. 486,878.

The invention relates to hand trucks such as are used for handling freight, baggage, packages, and bulky or heavy articles of various kinds. We aim to improve and strengthen the construction of such trucks, adapting them to handle extremely heavy loads, and to support different kinds of loads effectively,—all without making the truck itself unduly heavy. How these and other advantages can be realized through the invention will appear from the description hereinafter of one preferred form of embodiment.

In the drawings, Fig. I is a side view of a hand truck conveniently embodying our invention.

Fig. II is a plan view of the truck.

Figs. III, IV, and V are detail views, showing certain parts in section, taken as indicated by the lines and arrows III—III, IV—IV, and V—V in Fig. I.

The truck here shown includes a frame 9 with wheels 10, 10 near one end, handles 11, 11 at the other end, and intermediate legs 12, 12, on which the truck may rest with its frame in horizontal or slightly sloping position. It also has an upward-sloping nose piece 13 at the end beyond the wheels 10, 10. The frame 9 comprises longitudinal side members or sills 14, 14, of channel section, with bead-embossed lower edges, united by the U-shaped nose piece 13 and by cross members 15, 16, 17, 18, also of channel section. With the cross members 15, 16, 17, 18 are associated intermediate longitudinals 19, 19, of channel section, which co-operate with the cross members to form an openwork cradle or bottom for the truck.

As shown in Figs. II, III, IV, and V, the cross members 15, 16, 17, 18 have their ends flattened by outward bending of the channel flanges, and seated in depressions in the sills 14, 14, to which they are secured by a couple of fastenings 20, 20 each, through the channel webs. The intermediate longitudinals 19, 19 are similarly flattened at their intersections with the cross members 15, 16, 17, 18, and secured thereto by fastenings 21, so as to interconnect the cross members. While the cross-members 15 and 16 are substantially straight, so as to afford fully distributed support to a flat-sided box or package resting on the truck, the cross-members 17 and 18 are concaved, as shown in Figs. III and IV, to accommodate the convexity of a sack, bale, package or barrel,—the member 18 being concaved more than the member 17. The ends 22, 22 of the nose piece 13 extend rearward along the tops of the sills 14, 14 over the ends of the cross-members 18 and 17, and are secured to the sills by the same fastenings 20, 20 that secure said cross-members.

As shown in Figs. I, II and IV, the wheels 10, 10 are mounted on an axle 23 whose ends are secured to V-brackets 24, 24 of flat bar metal, attached to the sills 14, 14. The legs of each bracket 24 are cylindrically concaved inward, for greater rigidity, and extend upward into the channelled side member 14; its upper ends are bent outward to form flat feet 25, 25, which are fastened to the bottom of the channel web by the same fastenings 20 that secure the cross-members 17, 18. The horizontal mid-portion 26 of the bracket 24 is concaved upward to accommodate the axle 23, which is clamped to the bracket by a downward-concaved clamp piece 27, secured by fastenings 28, 28 through the bracket portion 26. As shown in Fig. IV, each of the wheels 10, 10 consists of a sheet metal rim and conical web, which is riveted at 29 to a flange on a hub 30, mounted on the axle 23, with roller bearings 31, between an inner thrust shoulder or flange 32 and a removable outer shoulder or washer 33. Preferably, the wheels 10, 10 are located inside the brackets 24, 24 and the sills 14, 14, rather than outside them.

Referring, now, to Figs. II, III and IV, it will be seen that oblong flat plates 35 are shown on the truck frame 9 extending fore and aft between the ends of the cross-members 17, 18, with their outer edges located at the inner sides of the sills 14, 14, and, indeed, abutting against the inner edges of the nose-piece ends 22, 22 whereby they co-act with the side members or sills 14, 14 in bracing the truck against angular distortion. These plates 35, 35 correspond in transverse dimension to the straight, horizontal portions of the cross-members 17, 18 at either side of their concave mid-portions. The ends of these plates 35, 35 are shown overlapping the webs of the cross-members 17, 18 and secured thereto, by fastenings 36, 36 at the outer corners of the plates adjacent the sills 14, 14, and fastenings 37, 37 at their inner corners. These plates 35, 35 perform several important functions: they brace and reinforce the truck frame 9 (and the whole truck) against angular distortion in a horizontal plane; they overlie the wheels 10, 10 and protect them from contact or entanglement with the truck load; and they afford attachment for directly sway-bracing the truck transversely. For this latter purpose, diagonal braces 38, 38 extend from the inner margins of the plates 35 downward and inward to the mid-portion of the axle 23. As shown in Fig. IV, these braces 38, 38 are formed by a flat bar fastened to the axle 23 at 39 and bent upward at either side of this fastening, with the ends bent outward and fastened to the plates 35, 35 at 41, 41. Thus the truck frame is transversely trussed, and the axle 23 is also positively secured in case of loosening of the clamps 27, 27.

As shown in Fig. I, each of the truck legs 12, 12 is V-shaped, and formed of flat bar metal suitably bent. The upright portions of each foot are cylindrically concaved inward for greater rigidity, and their upper ends are bent outward to afford flat feet or ears 42, 43, which are secured to the sills 14, 14 by the same fastenings 20 that secure the cross-members 15, 16. The ear 42 lies directly against the inside of the channel web (Figs. I and IV), while the wooden handle 11 intervenes between the ear 43 and the channel web, and is thus clamped by the fastenings 20, 20. The legs 12, 12 are braced transversely by diagonal sway braces 44, 44 of flat bar metal, attached to the rear upright portions of the legs by fastenings 45, 45, and to the cross member 15, at its intersections with the longitudinals 19, 19, by the fastenings 21, 21 that secure said parts 15, 19 to one another. These braces 44, 44 are twisted 90° to bring the upper ends into a plane to be bent so as to lie flat against the webs of the channel 15. The lower end of each leg 12 is shod with a bent sheet metal wear plate 46, welded thereon (Fig. I).

Each handle 11 is not only secured by the fastenings 20, 20, but also by a fastening 47 extending from its lower side up through the channel web, and also by a transverse fastening 48 through the channel flanges. As shown in Figs. I and V, a metal strip 49 is interposed between the ear 43 and the wood, and also affords bearing for the head of the fastening 47.

As shown in Figs. I and III, each of the channelled side members 14, 14 has its flanges braced by suitably located spacing stays or fastenings 40, consisting of rivets through spacing sleeves 51.

It will be understood that any of the fastenings referred to in the foregoing description, or shown in the drawings, may be either bolts or rivets, though generally shown as bolts.

Having thus described our invention, we claim:

1. In a hand truck of the character described, the combination with side members having handles at their rear ends, brackets depending from said side members and a transverse axle mounted thereon, with wheels on said axle inside said brackets, and cross-members interconnecting said side members, one to either side of said axle; of oblong plates extending fore and aft over said wheels between the ends of said cross members, and secured to said cross members and coacting with said side members to brace the truck against angular distortion, and diagonal braces from the inner margins of said plates downward and inward to the mid-portion of said axle.

2. In a hand truck of the character described, the combination with side members having handles at their rear ends, and an upstanding nose member interconnecting their forward ends, the end portions of said nose extending rearward along the tops of said side members and being each secured thereto at a plurality of points, and cross members interconnecting said side members with their ends interposed and secured between the latter and the ends of said nose piece, of oblong plates extending fore and aft over said wheels between the ends of said cross members and secured thereto with their outer edges engaged against the inner surfaces of the ends of the nose piece, so as to brace the truck against angular distortion.

In testimony whereof, we have hereunto signed our names at Philadelphia, Pennsylvania, this 2nd day of October, 1930.

DAVID M. WATSON.
GONZALO C. MUÑOZ.